United States Patent [19]
Miyoshi et al.

[11] Patent Number: 5,485,604
[45] Date of Patent: Jan. 16, 1996

[54] FAULT TOLERANT COMPUTER SYSTEM COMPRISING A FAULT DETECTOR IN EACH PROCESSOR MODULE

[75] Inventors: Hiroaki Miyoshi; Yasuhiko Mizushima; Makoto Ohtsuka; Hiroki Hihara, all of Tokyo, Japan

[73] Assignee: NEC Corporation, Tokyo, Japan

[21] Appl. No.: 145,647

[22] Filed: Nov. 4, 1993

[30] Foreign Application Priority Data

Nov. 6, 1992 [JP] Japan ................................ 4-296942

[51] Int. Cl.⁶ .................................................. G06F 11/34
[52] U.S. Cl. ......................................................... 395/182.08
[58] Field of Search .............................. 395/575; 371/7, 371/8.1, 8.2, 11.1, 36, 9.1, 67.1, 68.3

[56] References Cited

U.S. PATENT DOCUMENTS

| | | | |
|---|---|---|---|
| 3,681,578 | 8/1972 | Stevens | 235/153 |
| 4,750,177 | 6/1988 | Hendrie et al. | 371/32 |
| 4,817,091 | 3/1989 | Katzman et al. | 371/9 |

FOREIGN PATENT DOCUMENTS 61-283954  12/1986  Japan.

Primary Examiner—Robert W. Beausoliel, Jr.
Assistant Examiner—Phung My Chung
Attorney, Agent, or Firm—Foley & Lardner

[57] ABSTRACT

In each module (11) of three or more central processor modules of a fault tolerant computer system, a detector (45) receives a comparator output signal and like comparator output signals from two adjacent modules and produces a detector output signal which confirms absence and presence of a fault in one of the above-mentioned each module. When the fault is confirmed, a controller or processor (49) isolates the module under consideration from the system by inhibiting delivery of a controlled output signal to a bus (31) and by connecting, with the module in question bypassed, switching units (53(1), 53(2)) of the adjacent modules. Preferably, one of the modules of the system is used as a master module of ordinarily delivering the controlled output signal to the bus with others used as checker modules of ordinarily inhibiting the delivery. When a fault appears in the master module, its controller delivers a module operation switching signal to the controllers of the checker modules to thereby substitute one of the checker modules for the master module subjected to the fault.

14 Claims, 3 Drawing Sheets

FAULT TOLERANT COMPUTER SYSTEM COMPRISING A FAULT DETECTOR IN EACH PROCESSOR MODULE

BACKGROUND OF THE INVENTION

This invention relates to a fault tolerant computer system which comprises three or more central processor modules and from which a processor module is isolated when a fault is present therein.

Various fault tolerant computer systems are known. In one of the fault tolerant computer systems that is disclosed in Japanese patent prepublication (A) No. 283,954 of 1986, each central processor module tests itself whether or not a fault is present therein.

In the manner which will later be described in greater detail, such a fault is detected in general by dynamic redundancy with one of the processor modules isolated in which the fault is detected. The dynamic redundancy is classified into hybrid redundancy, self purging redundancy, and shift out redundancy. In accordance with the hybrid redundancy and the self purging redundancy, a majority decision circuit is used in common to the central processor modules. According to the shift out redundancy, a multiplexer is used in common to the central processor modules.

In such a conventional fault tolerant computer system, an additional fault is unavoidable either in the majority decision circuit or in the multiplexer in addition to the fault in the central processor module. The additional fault gives rise to system down of the fault tolerant computer system and gives a reduced reliability to the fault tolerant computer system.

In accordance with the hybrid redundancy, the fault tolerant computer system includes a noncoincidence detector and a switching circuit. According to the shift out redundancy, the fault tolerant computer system includes a comparator and a detecting circuit. Each of the noncoincidence detector, the switching circuit, the comparator, and the detecting circuit serves as an external circuit common to the central processor modules of the fault tolerant computer system. On giving a greater scale to the fault tolerant computer system, the external circuit must accordingly be modified. Use of such an external circuit is therefore objectionable in order to give a flexibility to the fault tolerant computer system. This is a problem common to the hybrid redundancy, the self purging redundancy, and the shift out redundancy.

SUMMARY OF THE INVENTION

It is consequently an object of the present invention to provide a fault tolerant computer system which comprises three or more central processor modules and neither a majority decision circuit nor a multiplexer and which has a high reliability.

It is another object of this invention to provide a fault tolerant computer system which is of the type described and which is seldom subjected to a serious damage.

It is still another object of this invention to provide a fault tolerant computer system which is of the type described and comprises no single external circuit module to be scarcely subjected to a fault and which has a flexibility on changing a scale thereof.

Other object of this invention will become clear as the description proceeds.

In accordance with this invention, there is provided a fault tolerant computer system which comprises at least three central processor modules connected to a bus as a primary module and first and second adjacent modules and which is characterised in that each module of the primary and the first and the second adjacent modules comprises: (A) a controllable central processor unit connected to the bus for producing a processor output signal and for transferring the processor output signal as a controlled output signal to the bus, the central processor unit of the primary module producing the processor output signal as a local processor signal; (B) a comparator connected to the central processor unit and to the bus for producing a comparator output signal, the comparator of the primary module being supplied with the local processor signal and with the controlled output signal as a single output signal from one of the first and the second adjacent modules to compare the local processor signal with the single output signal and to produce the comparator output signal as a local comparator signal representative of whether the local processor signal is coincident or incoincident with the single output signal; and (C) an isolating unit connected to the comparator, the isolator unit of the primary module isolating the primary module from the fault tolerant computer system by connecting the isolating units of the first and the second adjacent modules with the isolating unit of the primary module bypassed when the isolating unit of the primary module confirms a fault in the primary module.

DESCRIPTION OF THE PREFERRED EMBODIMENT

Figure 1:
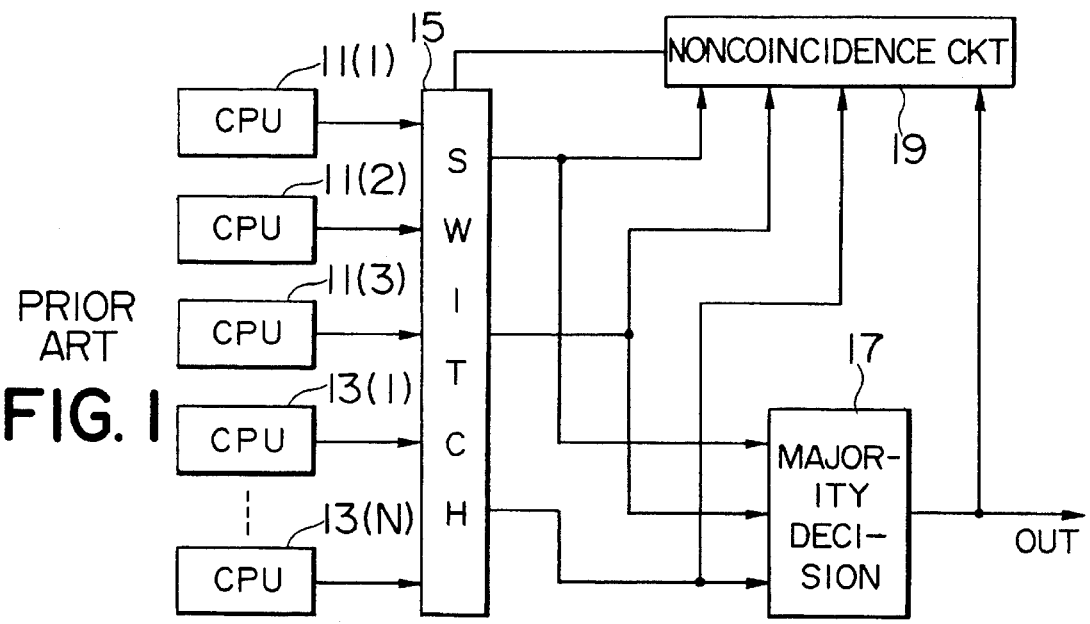
FIG. 1 is a block diagram of a conventional fault tolerant computer system.

Referring to FIG. 1, a conventional fault tolerant computer system will first be described in order to facilitate an understanding of the present invention. The fault tolerant computer system makes use of the hybrid redundancy mentioned heretobefore. The hybrid redundancy is so named because it is a hybrid of static redundancy and standby redundancy. In general, a hybrid redundancy fault tolerant computer system comprises a triple modular redundancy (TMR) system and a plurality of standby central processor modules (CPU).

In the example illustrated in FIG. 1, the fault tolerant computer system includes first through third active central processor modules 11(1), 11(2), and 11(3) which are used in the triple modular redundancy system. The fault tolerant computer system additionally comprises first through N-th standby central processor modules 13(1), 13(2), . . . , and 13(N), where N represents an integer which is not less than two. The active central processor modules 11 (suffixes omitted) and the standby central processor modules 13 (suffixes omitted) are labelled CPU. Although referred to herein as standby central processor modules 13, these modules 13 are also put in operation in synchronism with the central processor modules 11 of the triple modular redundancy system.

The active and the standby central processor modules 11 and 13 are connected through a switching circuit 15 to a majority decision circuit 17. Ordinarily, the switching circuit 15 delivers first through third active output signals of the active central processor modules 11 to the majority decision circuit 17. By majority decision, the majority decision circuit 17 selects an eventual output signal OUT of the fault tolerant computer system.

The active output signals and the eventual output signal are supplied to a noncoincidence detector 19. When a fault appears in at least one of the active central processor modules that is herein called a faulty module, the active output signal of the faulty module is coincident with none of other active output signals and the eventual output signal. Detecting coincidence and incoincidence between the eventual output signal and the first through the third active output signals, the noncoincidence detector 19 locates the faulty module among the active central processor modules 11 and produces a noncoincidence signal indicative of the faulty module. In response to the noncoincidence signal, the switching circuit 15 isolates the faulty module from the fault tolerant computer system. In this event, the switching circuit 15 selects one of the standby central processor modules 13, such as the first standby central processor module 13(1), as a substitute module and substitutes an output signal of the substitute module for the output signal of the faulty module.

Figure 2:
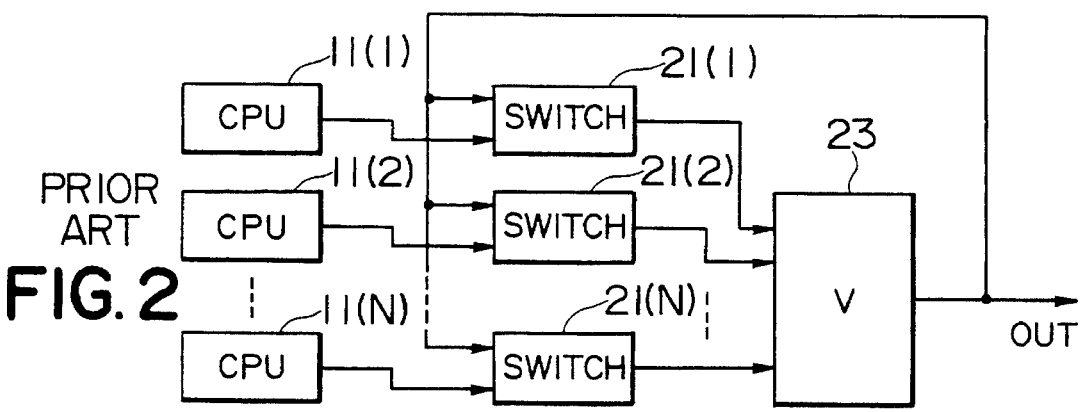
FIG. 2 is a block diagram of another conventional fault tolerant computer system.

Turning to FIG. 2, the description will proceed to a self purging redundancy fault tolerant computer system. Similar parts are designated by like reference numerals with the suffixes used and not used depending on the circumstances. In this fault tolerant computer system, the central processor modules are all active central modules 11.

In the example being illustrated, the fault tolerant computer system includes three or more central processor modules 11(1), 11(2), . . . , and 11(N), where N now represents an integer which is equal at least to three. Use is made of first through N-th switches (SW) 21(1), 21(2), . . . , and 21(N) in one-to-one correspondence to the central processor modules 11. Through the switches 21 (suffixed omitted), the central processor modules 11 are connected to a majority decision mechanism (V) 23. Like the switching circuit 15 and the majority decision circuit 17 described in conjunction with FIG. 1, the switches 21 and the majority decision mechanism 23 cooperate to produce the eventual output signal OUT. As herein called, the majority decision mechanism 23 is supplied with a variable number of input signals and is a sort of a threshold circuit.

Together with the eventual output signal, a decision signal is produced by the majority decision mechanism 23 to indicate those of the central processor modules 11 from which individual output signals are delivered through the switches 21 to the majority decision mechanism 23. The eventual output signal is consequently fed back to the switches 21 to make the switches 21 deliver the individual output signals of those of the central processor modules 11 which are other than the faulty module. In other words, the switches 21 logically isolate the faulty module from the fault tolerant computer system.

Figure 3:
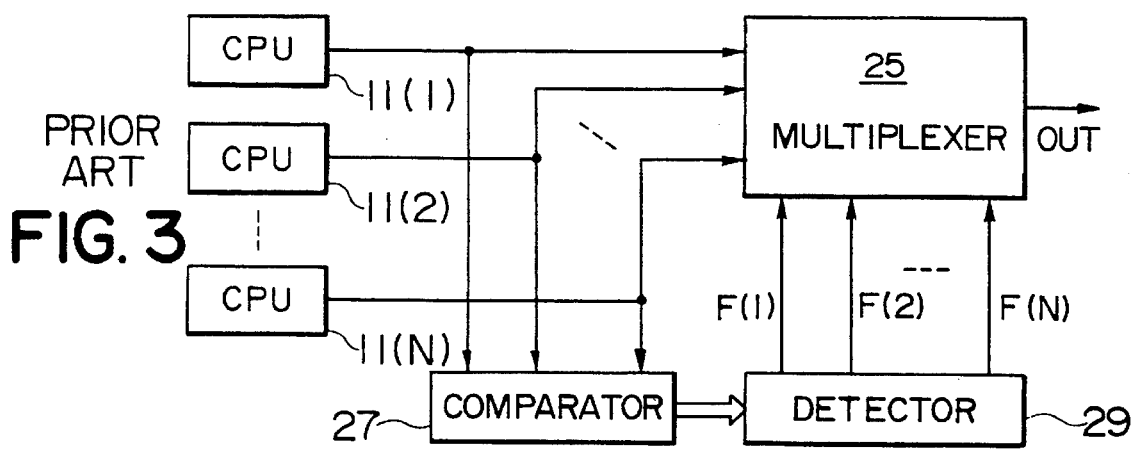
FIG. 3 is a block diagram of still another conventional fault tolerant computer system.

Further turning to FIG. 3, attention will be directed to a shift out redundancy fault tolerant computer system. Like the fault tolerant computer system illustrated with reference to FIG. 2, the fault tolerant computer system of FIG. 3 comprises three or more central processor modules which are again denoted by the reference numerals 11(1), 11(2), . . . , and 11(N). This fault tolerant computer system, however, comprises neither a majority decision circuit nor a majority decision mechanism.

Individual output signals of the central processor modules 11 are supplied to a multiplexer 25. Controlled in the manner which will presently be described, the multiplexer 25 selects one of the individual output signals as an eventual output signal OUT.

More particularly, the central processor modules 11 are connected to a comparator 27 besides to the multiplexer 25. The comparator 27 compares two of the individual output signals with each other. Comparing in this manner the individual output signals with one another, the comparator 27 produces comparison result signals which represent comparison results, namely, coincidence and incoincidence, and are $_NC_2$ or $N(N-1)/2$ in number.

The result signals are delivered to a detector 29. Based on the comparison results, $N(N-1)/2$ in number, the detector 29 produces first through N-th detection signals F(1) to F(N) in one-to-one correspondence to the first through the N-th central processor modules 11. The detection signals F (suffixes omitted) represent whether or not corresponding ones of the central processor modules 11 are subjected to the fault. Responsive to the detection signals, the multiplexer 25 isolates the faulty module from the fault tolerant computer system.

Reviewing FIGS. 1 through 3, such a conventional fault tolerant computer system includes either the multiple decision circuit or mechanism 17 or 23 or the multiplexer 25. Furthermore, use is made of either the switching circuit 15 or the switches 21. In FIG. 1, the noncoincidence detector 19 is additionally necessary. Alternatively, use is made of the comparator 27 and the detecting circuit 29. Such conventional fault tolerant computer systems are therefore defective in the manner pointed out hereinabove. In addition, a considerable number of comparison result signals are used in FIG. 3.

Figure 4:
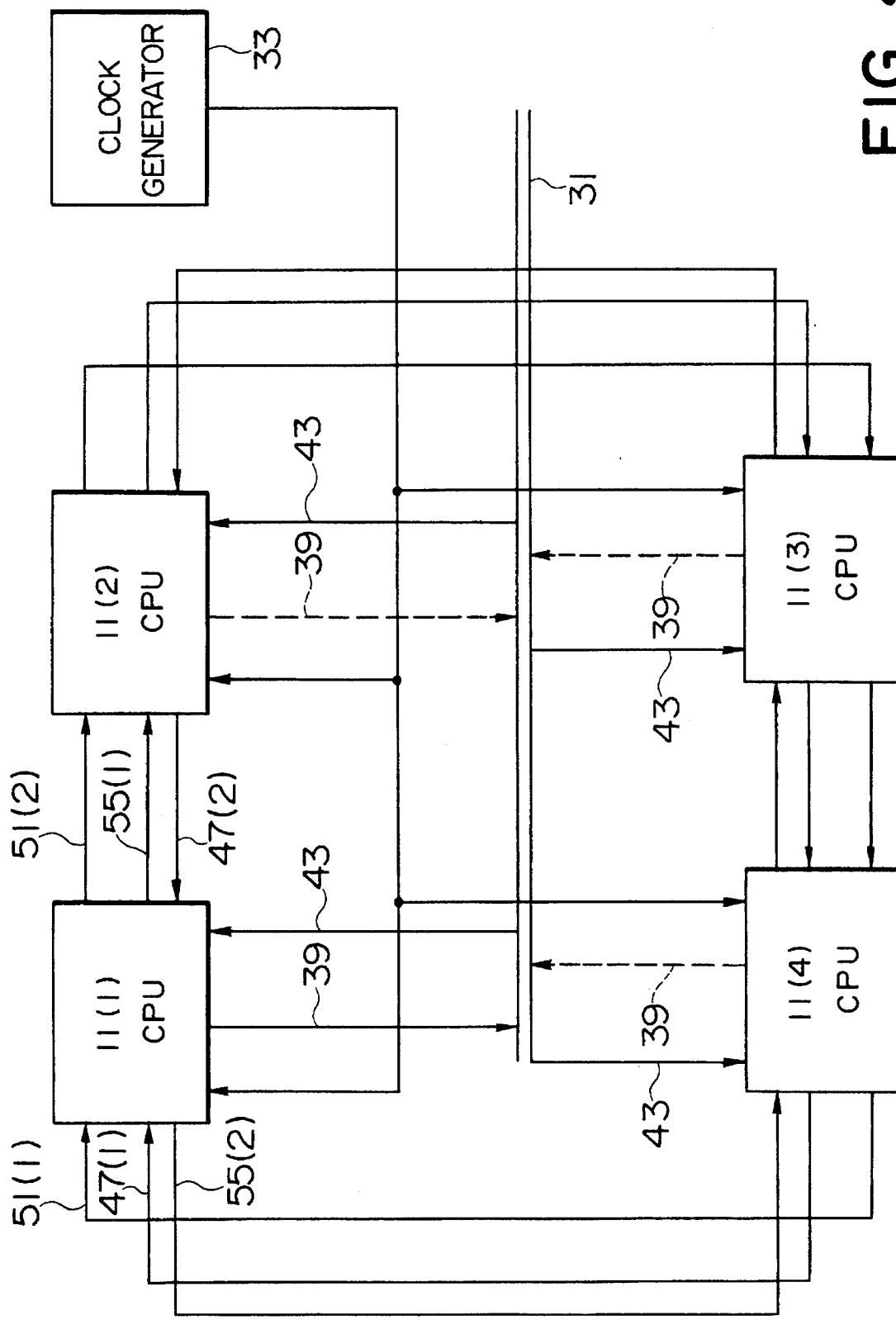
FIG. 4 is a block diagram of a fault tolerant computer system according to an embodiment of the instant invention.

Referring now to FIG. 4, the description will be directed to a fault tolerant computer system according to a preferred embodiment of this invention. The fault tolerant computer system comprises four central processor modules (CPU). In the example being illustrated, first through fourth central processor modules are used like in the fault tolerant computer system illustrated with reference to FIG. 2 or 3 and are denoted by reference numerals 11(1) to 11(4). The central processor modules 11 are connected to a bus or external input-output line 31. A clock generator 33 generates a sequence of system clock pulses for supply to the central processor modules 11. As depicted, the central processor modules 11 are connected to each other in a ring fashion.

Figure 5:
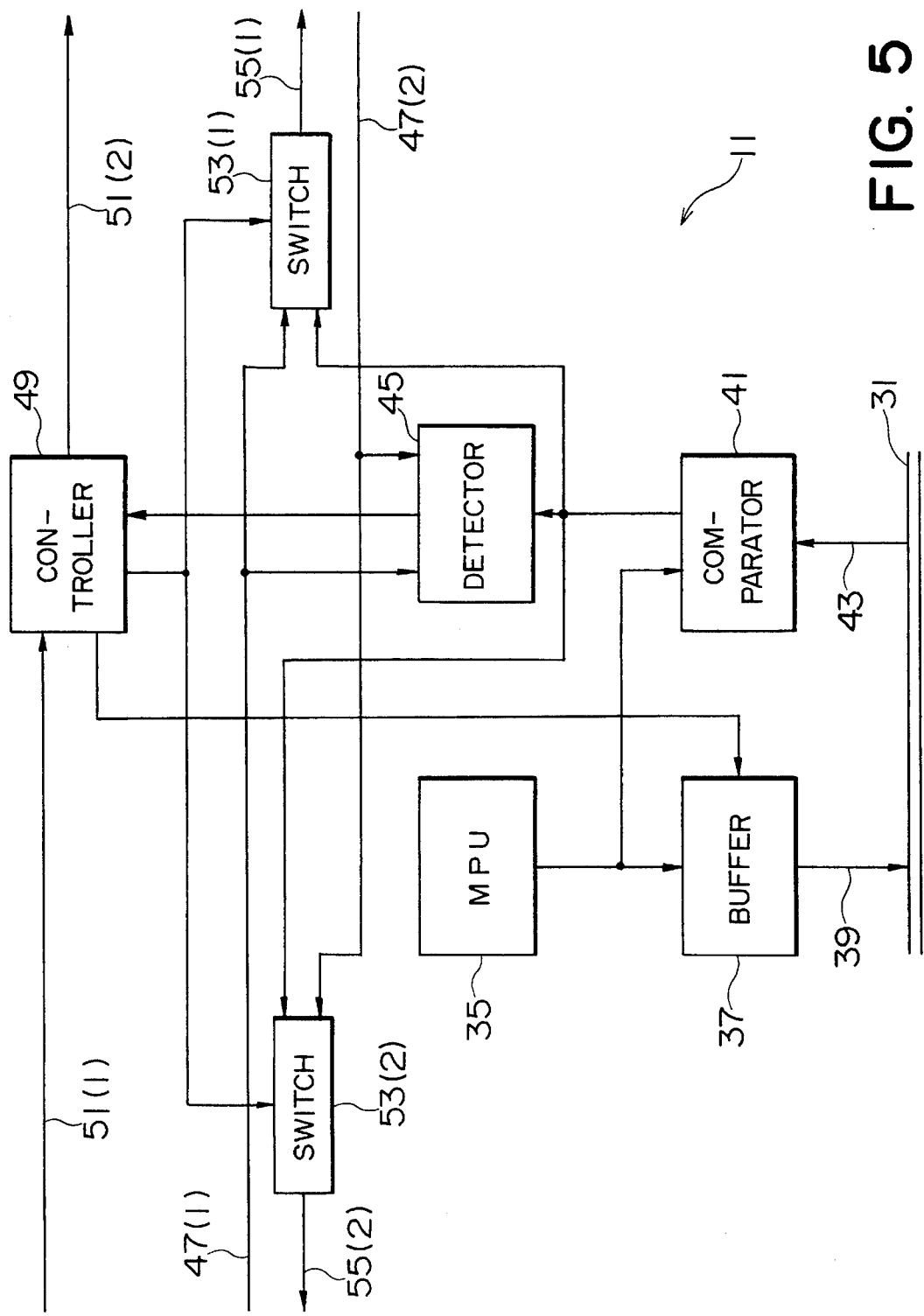
FIG. 5 shows, in blocks and together with a bus, each central processor module which is used in the fault tolerant computer system depicted in FIG. 4.

FIG. 5 will be referred to, in addition to FIG. 4. The central processor modules 11 are similar in structure with no exceptions and in operation except for some points which will become clear as the description proceeds. Each module will be designated by the reference numeral 11 with no suffixes used. The module 11 comprises a central processor 35 connected to the bus 31 through a controllable buffer 37. For example, the central processor 35 is a microprocessor unit (MPU) and is so labelled. In any event, the central processor 35 produces a processor output signal in the manner known in the art. Controlled as will later be described, the buffer 37 delivers the processor output signal to the bus 31 through a data output line 39 as a controlled output signal. As a consequence, a combination of the central processor 35 and the controllable buffer 37 serves as a controllable central processor unit connected to the bus 31 through the data output line 39 to produce the processor output signal and to deliver the controlled output signal to the bus 31. It is possible to use the output line 39, although so named, in supplying the central processor 35 with an address signal and input data which should be processed in the central processor 35.

In the central processor modules 11, the central processors, such as 35, are controlled by the system clock pulses and synchronously produce processor output signals. In the example illustrated in FIG. 4, only one of the central processor modules 11 delivers the controlled output signal to the bus 31 in the manner which will later become clear. This one is herein called a master module. In others of the central processor modules 11, the controllable central processor unit (35, 37) does not deliver the controlled output signal to the bus 31. These others of the central processor modules 11 are herein referred to as checker modules.

It is possible to presume without loss of generality that the first central processor module 11(1) is the master module. Other central processor modules 11(2) through 11(4) are checker modules. In FIG. 4, the data output lines 39 are depicted by a solid line for the master module 11(1) and by dashed lines for the checker modules 11(2) to 11(4). The bus 31 may be connected to an input/output device (not shown) for utilizing the controlled output signal of the master module and for producing the address signal and an input data signal representative of the input data.

In each module 11, a comparator 41 is connected to the central processor 35 and to an input line 43 and thence to the bus 31. The illustrated module 11 will now be called a local module. In the manner depicted in FIG. 4, the local module is connected to first and second modules of other central processor modules 11. It will be assumed that the first and the second modules are positioned leftwardly and rightwardly in FIG. 5 of the local module.

When produced by the central processor unit of the local module, the processor output signal and the controlled output signal are herein referred to as a local processor signal and a local output signal. The comparator 41 of the local module 11 is supplied with the local processor signal and the controlled output signal of the master module and compares these two signals to produce a local comparator signal. In this manner, the comparator 41 of each module produces a comparator output signal indicative of absence or presence of a fault in the local module. Being indicative of coincidence and incoincidence, the comparator output signal is alternatively called an intramodule coincidence and incoincidence signal.

In each module, a detector 45 is connected to the comparator 41 and is supplied with a first selector output signal which will presently be described and is delivered thereto through a first input coincidence and incoincidence line 47(1) from the first module. Similarly, the detector 45 is supplied with a second selector output signal through a second input coincidence and incoincidence line 47(2) from the second module.

Based on the local comparator signal and the first and the second selector output signals, the detector 45 produces a local detector signal which confirms whether or not the local module is really defective because of the fault therein. In this manner, the detector 45 of each module produces a detector output signal which confirms absence and presence of the fault in the local module. Attention is directed to the fact that the detector 45 is used separately of the comparator 41 on confirming presence or absence of the fault in the local module in consideration of the intramodule coincidence and incoincidence signals produced in the first and the second modules. This makes it possible to detect a fault which might take place in the comparators of the local and the first and the second modules.

A controller or processor 49 is supplied with the detector output signal from the detector 45. The controller 49 of the local module 11 is connected to the controller of the first and the second modules through first and second module operation switching lines 51(1) and 51(2). The module operation switching lines 51 (suffixes omitted) will presently become clear.

The controller 49 is connected to the controllable buffer 37 of the central processing unit and to first and second switches 53(1) and 53(2) which are connected in turn to the first and the second input coincidence and incoincidence lines 47(1) and 47(2) and to first and second output coincidence and incoincidence lines 55(1) and 55(2). The switches 53 (suffixes omitted) are herein referred to collectively as a selecting or switching unit. Through the input coincidence and incoincidence lines 47 (suffixes omitted) and through the output coincidence and incoincidence lines 55 (suffixes omitted), the selecting unit (53) of the local module 11 is connected to the selecting units of the first and the second modules.

Each pair of the first input and the first output coincidence and incoincidence lines 47(1) and 55(1) and of the second input and the second output coincidence and incoincidence lines 47(2) and 55(2) is for relaying an intermodule coincidence and incoincidence signal between the first and the second modules through the selecting unit of the local module. In the local module, the selecting unit is supplied with the intramodule coincidence and incoincidence signal. While the local detector signal confirms absence of the fault, the controller 49 makes the selecting unit of the local module transmit the intramodule coincidence and incoincidence signal as the intermodule coincidence and incoincidence signal to each of the first and the second modules.

When a fault takes place in the local module 11, the local detector signal confirms presence of the fault as an abnormal signal. Responsive to the abnormal signal, the controller 49 logically isolates the local module from the fault tolerant computer system and renders the system faultless. More particularly, the controller 49 produces a controller output signal indicative of first and second indications when the detector output signal confirms absence and presence of the fault, respectively. Like the local processor signal and others, the controller output signal may be called a local controller signal when produced by the controller 49 being illustrated. A part of the local controller signal is delivered to the controllable buffer 37 as an allowance and inhibit signal which will shortly be described. Another part of the local controller signal is delivered to the selecting unit as a switch control signal indicative of the first and the second indications.

When the switch control signal indicates the first indication, the selecting unit delivers the local comparator signal as first and second local selector signals to the selecting unit of the first module and to the selecting unit of the second module in the manner described before. When the switch control signal indicates the second indication, the selecting unit of the local modulator becomes transparent between the coincidence and incoincidence lines 47 and 55. That is, the intermodule coincidence and incoincidence signals are delivered from the first and the second modules as the above-mentioned first and second selector output signals and are delivered as the second and the first local selector signals to the first and the second modules, respectively, as they stand. In this manner, the local module is isolated from the fault tolerant computer system with the selecting units of the first and the second modules directly connected and with the selecting unit of the local module bypassed when the fault is confirmed in the local module.

It is now understood in connection with each module 11 that a combination of the detector 45 and the controller 49 serves as a controller unit connected to the comparator 41 for producing the controller output signal to indicate the first and the second indications by confirming absence and presence of the fault. A greater combination of the selecting unit (53) and the controller unit (45, 49) serves as an isolating unit connected to the comparator 41 for isolating the local module from the fault tolerant computer system by connecting the isolating units of the first and the second modules with the isolating unit (47, 49, 53) of the local unit bypassed when it is confirmed that the local detector signal indicates presence of the fault in the local module. The selecting units, the detectors, and the controllers, such as 53, 45, and 49, and hence the isolating units of the first, the local, and the second modules are connected to one another in a linear array fashion.

It will now be surmised that the local module 11 is the master module. While the local controller signal indicates the first indication, the allowance and inhibit signal allows the controllable buffer 37 to deliver the local processor signal to the bus 31 through the data output line 39 as the local output signal. It will next be surmised that the local module 11 is one of the checker modules. While the local controller signal indicates the first indication, the allowance and inhibit signal inhibits the controllable buffer 37 and suspends delivery of the local processor signal to the bus 31 as local output signal. It is now understood that the buffer 37 serves as a controllably allowing and inhibiting arrangement.

The master module may give rise to a fault therein. When the master module becomes a failure module in this manner, the local comparator signals of the checker modules would indicate presence of incoincidence in all checker units although no faults are actually present. The detector 45 of the failure module confirms this fact and produces the abnormal signal. In this event, the controller 49 of the failure module produces its local controller signal with indication of the second indication and delivers this local controller signal as a module operation switching signal to a particular module of the checker modules.

When produced with indication of the second indication as a result of confirmation by the detector of presence of the fault in the failure module, the local controller signal isolates the failure module from the fault tolerant computer system. Together with the isolating unit, the controller is bypassed to be transparent between the first and the second module operation switching lines 51. In the failure module, the allowance and inhibition signal of the second indication inhibits the controllable buffer so as not to deliver the processor output signal to the bus 31.

It will be surmised without loss of generality that the module operation switching signal is delivered from the local or the failure module to the second module. If the detector of the second module confirms presence of the fault, its controller is bypassed. The module operation switching signal is further delivered to the controller of a next module. It will additionally be surmised that the particular module is the local module 11 being illustrated.

Inasmuch as the detector 45 confirms absence of the fault in the local module 11, the controller 49 makes the local controller signal indicate the first indication, producing no module operation switching signal. The selecting unit (53) delivers the local comparator signal to the first and the second modules. It should be noted that the allowance and inhibition signal now allows the controllable buffer 37 so as to deliver the local processor signal on the local output signal to the bus 31 through the data output line 39. The local module 11 is now a substitute module which takes over operation of the master module.

While this invention has thus far been described in specific conjunction with a single preferred embodiment thereof, it will now be readily possible for one skilled in the art to put this invention into effect in various other manners. For example, the fault tolerant computer system may comprise a great number of central processor modules. Even in this event, the central processor modules are possessed of a common structure. The fault tolerant computer system is consequently inexpensive despite the great number of central processor modules and is flexible to an increase or a decrease in the number of central processor modules. It is possible to put the central processor modules 11 without discrimination between the master module and the checker modules insofar as the fault is absent. Furthermore, it is possible to use an intelligent device, for example, either a digital signal processor (DSP) or a DMA unit, as each of the central processor modules 11. It should therefore be understood that such an intelligent device is an equivalent of the central processor module 11.

What is claimed is:

1. A fault tolerant computer system comprising at least three central processor modules connected to a bus as a primary module and first and second adjacent modules, wherein each module of said primary and said first and said second adjacent modules comprises:

a controllable central processor unit connected to said bus for producing a processor output signal and for controllably transferring said processor output signal as a controlled output signal to said bus, the controllable central processor unit of said primary module producing said processor output signal as a local processor signal;

a comparator connected to the controllable central processor unit of said each module and to said bus for producing a comparator output signal, the comparator of said primary module being supplied with the local processor output signal and with the controlled output signal as a single output signal from one of said first and said second adjacent modules to compare said local processor signal with said single output signal and to produce said comparator output signal as a local comparator signal representative of whether said local processor signal is coincident or incoincident with said single output signal; and an isolating unit connected to the comparator of said each module, the isolating unit of said primary module isolating said primary module from said fault tolerant computer system by connecting isolating units of said first and said second adjacent modules with the isolating unit of said primary module bypassed when the isolating unit of said primary module confirms a fault in said primary module.

2. A fault tolerant computer system as claimed in claim 1, wherein the isolating units of said primary and said first and said second adjacent modules are connected in a linear array fashion.

3. A fault tolerant computer system as claimed in claim 1, wherein the isolating unit of said each module comprises:

a controlling unit connected to the comparator of said each module for producing a controller output signal, the controlling unit of said primary module producing said controller output signal as a local controller signal indicating first and second indications corresponding to absence and presence of the fault respectively in said primary module; and a selecting unit connected to the comparator of said each module and to the controlling unit of said each module for producing a selector output signal, the selecting unit of said primary module being connected to selecting units of said first and said second adjacent modules and supplied with said local comparator signal, with first and second selector output signals from the selector units of said first and said second adjacent modules, and with said local controller signal for selecting said local comparator signal as a first local selector signal for supply to the selecting unit of said first adjacent module and as a second local selector signal for supply to the selecting unit of said second adjacent module when said local controller signal indicates said first indication and for selecting said second selector output signal as said first local selector signal and said first selector output signal as said second local selector signal when said local controller signal indicates said second indication.

4. A fault tolerant computer system as claimed in claim 3, wherein said controlling unit comprises:

a detector connected to the comparator of said each module and to comparators of said adjacent modules for producing a detector output signal, the detector of said each module producing said detector output signal as a local detector signal based on said local comparator signal and comparator output signals produced in said adjacent modules to confirm absence and presence of the fault in said each module; and a controller connected to the detector of said each module for producing said local controller signal of said first and said second indications based on said local detector signal which confirms absence and presence of the fault in said each module.

5. A fault tolerant computer system as claimed in claim 4, wherein:

one of said primary and said first and said second adjacent modules is used as a master module;

the controllable central processing unit of said master module comprising:

a central processor for producing said processor output signal; and controllably allowing and inhibiting means connected to said central processor, to said bus, and to the controller of said master module for controllably allowing delivery of said processor output signal as said controlled output signal to said bus when the controller of said master module produces a controller output signal indicating said first indication.

6. A fault tolerant computer system as claimed in claim 5, wherein:

the controller of said master module is connected to the controllers of said adjacent modules, produces said controller output signal and delivers said controller output signal as a module operation switching signal to the controller of one of other modules when the controller output signal of said master module indicates said second indication, said controllably allowing and inhibiting means of said master module inhibiting delivery of said processor output signal to said bus.

7. A fault tolerant computer system as claimed in claim 4, wherein:

one of said primary and said first and said second adjacent modules is used as a checker module;

the controllable central processing unit of said checker module comprising:

a central processor for producing said processor output signal; and controllably allowing and inhibiting means connected to said central processor, to said bus, and to the controller of said checker module for controllably inhibiting delivery of said processor output signal as said controlled output signal to said bus when the controller of said checker module produces a controller output signal to indicating said second indication state.

8. A fault tolerant computer system as claimed in claim 7, wherein:

another of said primary and said first and said second adjacent modules is used as a master module;

the controlling unit of said master module being connected to the controlling unit of said checker module and delivering a module operation switching signal to the controlling unit of said checker module when the detector of said master module produces a detector output signal indicating presence of a fault in said master module, said module operation switching signal switching operation of said checker module into operation of a substitute module which takes over operation of said master module;

the controllable central processing unit of said substitute module comprising said central processor and said controllably allowing and inhibiting means connected to said central processor and to said bus for allowing delivery of said processor output signal as said controlled output signal to said bus when supplied with the controller output signal indicating of said first indication.

9. A fault tolerant computer system comprising:

at least three central processor modules connected to a bus, said at least three central processor modules being connected in a ring fashion wherein each of said at least three central processor modules is connected to first and second adjacent modules and includes, a controllable central processor unit connected to said bus for producing a processor output signal and for controllably transferring said processor output signal as a controlled output signal to said bus, a comparator connected to said controllable central processor unit and to said bus for producing a comparator output signal, said comparator being supplied with said processor output signal and with said controlled output signal, said comparator output signal being representative of whether said processor output signal is coincident or incoincident with said controlled output signal, and an isolating unit connected to said comparator and to said first and second adjacent modules for isolating said each of said at least three central processor modules from rest of said at least three central processor modules of the fault tolerant computer system by connecting an isolating unit of said first adjacent module with an isolating unit of said second adjacent module and bypassing said isolating unit of said each of said at least three central processor modules when said isolating unit of said each of said at least three central processor modules confirms a fault.

10. A fault tolerant computer system as claimed in claim 9, wherein said isolating unit comprises:

a controlling unit connected to said comparator for producing a controller output signal, said controlling unit indicating first and second indications corresponding to absence and presence of a fault respectively in said each of said at least three central processor modules; and a selecting unit connected to said comparator, to selecting units of said first and second adjacent modules, and to said controlling unit for producing a selector output signal, said selecting unit being supplied with said comparator output signal, with first and second selector output signals from said first and second adjacent modules, and with said controller output signal for selecting said comparator output signal for supply to said selecting units of said first and second adjacent modules when said controller output signal indicates said first indication and for selecting said second selector output signal for supply to said selecting unit of said first adjacent module and said first selector output signal for supply to said selecting unit of said second adjacent module when said controller output signal indicates said second indication.

11. A fault tolerant computer system as claimed in claim 10, wherein said controlling unit comprises:

a detector connected to said comparator and to comparators of said first and second adjacent modules for producing a detector output signal based on said comparator output signal and selector output signals from said first and second adjacent modules, said detector output signal confirming one of absence or presence of a fault in said each of said at least three central processor modules; and a controller connected to said detector and to controllers of said first and second adjacent modules for producing said controller output signal indicating said first and second indications based on said detector output signal.

12. A fault tolerant computer system as claimed in claim 11, wherein said each of said at least three central processor modules further includes:

a central processor for producing said processor output signal; and controllably allowing and inhibiting means connected to said central processor, to said bus, and to said controller for controllably allowing delivery of said processor output signal as said controlled output signal to said bus when said controller output signal indicates said first indication.

13. A fault tolerant computer system as claimed in claim 12, wherein:

one of said at least three central processor modules is used as a master module;

said controller of said master module delivers a controller output signal indicating said first indication to said controllers of other modules; and said controllers of said other modules produce controller output signals indicating said second indication.

14. A fault tolerant computer system as claimed in claim 13, wherein when said controller output signal of said master module indicates said second indication, said controller of said master module delivers said controller output signal as a module operation switching signal to one of said other modules, said master module being switched to said one of other modules if said detector output signal of said one of said other modules is of said first indication.

* * * * *